US009851775B2

(12) United States Patent
Kritt et al.

(10) Patent No.: US 9,851,775 B2
(45) Date of Patent: Dec. 26, 2017

(54) POWER RESERVE BASED ON PREDICTED NATURAL CALAMITY

(71) Applicant: International Business Machines Corporation, Armonk, NY (US)

(72) Inventors: Barry A. Kritt, Atlantic Beach, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 14/853,700

(22) Filed: Sep. 14, 2015

(65) Prior Publication Data

US 2017/0075407 A1    Mar. 16, 2017

(51) Int. Cl.
*G06F 1/32*    (2006.01)

(52) U.S. Cl.
CPC ............ *G06F 1/3234* (2013.01); *G06F 1/329* (2013.01)

(58) Field of Classification Search
CPC .... G08B 21/10; G08B 27/001; G08B 27/006; H04W 4/02; H04W 4/22; H04W 76/007; H04W 8/005; H04W 4/008; H04W 64/00; H04M 1/72538; H04M 2250/12; Y04S 10/60
USPC .............................. 455/404.1, 3.01
See application file for complete search history.

(56) References Cited

U.S. PATENT DOCUMENTS

| | | | |
|---|---|---|---|
| 2008/0126282 A1 | 5/2008 | Sinclair et al. | |
| 2010/0167686 A1* | 7/2010 | Pan | G08B 21/02 455/404.1 |
| 2011/0016333 A1* | 1/2011 | Scott | G06F 1/266 713/300 |
| 2013/0176000 A1 | 7/2013 | Bishop et al. | |
| 2013/0278054 A1 | 10/2013 | Kritt et al. | |
| 2014/0038513 A1* | 2/2014 | Gotoh | G08B 25/016 455/3.01 |
| 2014/0195060 A1 | 7/2014 | Kritt et al. | |
| 2014/0220926 A1* | 8/2014 | Shikama | H04W 52/0277 455/404.1 |
| 2015/0033049 A1* | 1/2015 | Zhao | H04M 1/2745 713/320 |
| 2015/0208357 A1 | 7/2015 | Kritt et al. | |
| 2016/0209907 A1* | 7/2016 | Han | G06F 1/3209 |

FOREIGN PATENT DOCUMENTS

JP    5408689 B2    2/2014
KR    101513370 B1 *    4/2015

* cited by examiner

*Primary Examiner* — Lester Kincaid
*Assistant Examiner* — Gary Lafontant
(74) *Attorney, Agent, or Firm* — VanLeeuwen & VanLeeuwen; Noah Sharkan (57) ABSTRACT

An approach is provided for managing power usage in a mobile device upon predicting a natural calamity. The approach calculates a total power requirement and a next possible recharge time of the mobile device based on the predicted natural calamity characteristics. The approach further restricts one or more services on the mobile devices to reduce battery consumption by the mobile device. The restriction of services on the mobile device being based on the calculated total power requirement and the next possible recharge time.

13 Claims, 7 Drawing Sheets

POWER RESERVE BASED ON PREDICTED NATURAL CALAMITY

BACKGROUND OF THE INVENTION

Technical Field

This disclosure relates to reserving power for predicted natural calamity. More particularly, this disclosure charging and preserving power in mobile devices so that such devices are available during natural calamity.

Description of Related Art

Worldwide, many natural disasters, or calamities, occur affecting thousands if not millions of people. Most of the natural calamities that occur are weather related. While many of these disasters can be predicted, the severity of damage caused and the particular areas of damage are often difficult, if not impossible, to predict with any level of specificity. During a natural calamity, people need to communicate with other people for rescue, helping others, receiving help from rescue teams, calling doctors and care givers, and the like. Improper power management in mobile device can lead to running out off power during an emergency. A battery powered mobile device, such as a smart phone, is often critical in a natural calamity, especially when traditional modes of communication become inoperable due to the calamity. When power for charging to these devices is mismanaged, the devices might not be charged and available during or after the calamity and might result in an extremely dangerous situation to the device user that might need to communicate with others for life-saving help.

SUMMARY

An approach is provided for managing power usage in a mobile device upon predicting a natural calamity. The approach calculates a total power requirement and a next possible recharge time of the mobile device based on the predicted natural calamity characteristics. The approach further restricts one or more services on the mobile devices to reduce battery consumption by the mobile device. The restriction of services on the mobile device being based on the calculated total power requirement and the next possible recharge time.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1-7 show an approach for power reserve based on predicted natural calamity. Services installed in the mobile device gather weather forecast data from weather data provider(s) and, accordingly, analyze characteristics pertaining to a predicted natural calamity. These characteristics include the type of possible predicted natural calamity (e.g. heavy snow fall, flood, typhoon, severe thunderstorms, etc), the degree, or extent, of the predicted natural calamity, the predicted impacted zone of the natural calamity, and the predicted time ranges that the natural calamity is expected to last.

Services installed in mobile device search for historical data pertaining to natural calamities in the predicted zone for the predicted type of natural calamity. The approach calculates the total power requirement expected during the natural calamity and the predicted next possible recharge time.

The approach alerts the user of the mobile device of the predicted natural calamity and suggests that the user terminate some of the services running on the device. In addition, the approach also provides a means for the mobile device to automatically terminate services without user intervention. In addition, if the mobile device does not have enough power to last through the predicted natural calamity, then the device will alert the user that the device should be charged before the natural calamity occurs at which time electrical power may be lost during the course of the natural calamity.

Software installed in mobile device will start services based on upcoming disaster event. Services can start immediately before, during, or after the event. An example would be a homing beacon that wakes the mobile device and sends location information (and schedules a time when the next location ping will be sent) on a given time interval. The approach can let family members know you are in a danger zone and that your phone is still alive (can even require you to type a confirmation you are physically well when it is scheduled to send the message). The approach can then continue to send beacons on a time interval basis so that your family or emergency personnel can find you if you are injured or unconscious after the event until such functionality is disabled (which would send an "all clear" message to your family).

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
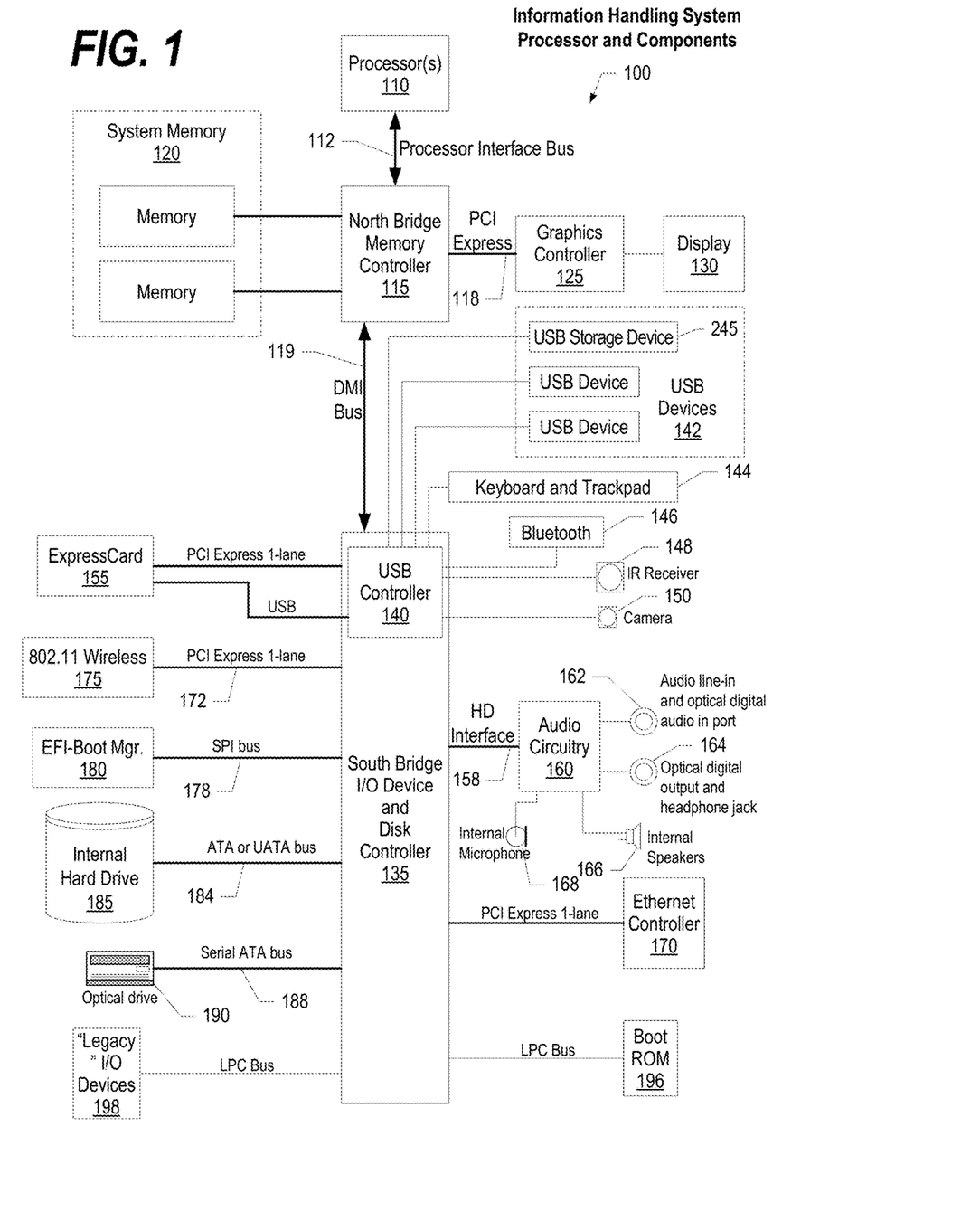
FIG. 1 depicts a block diagram of a processor and components of an information handling system.
Figure 2:
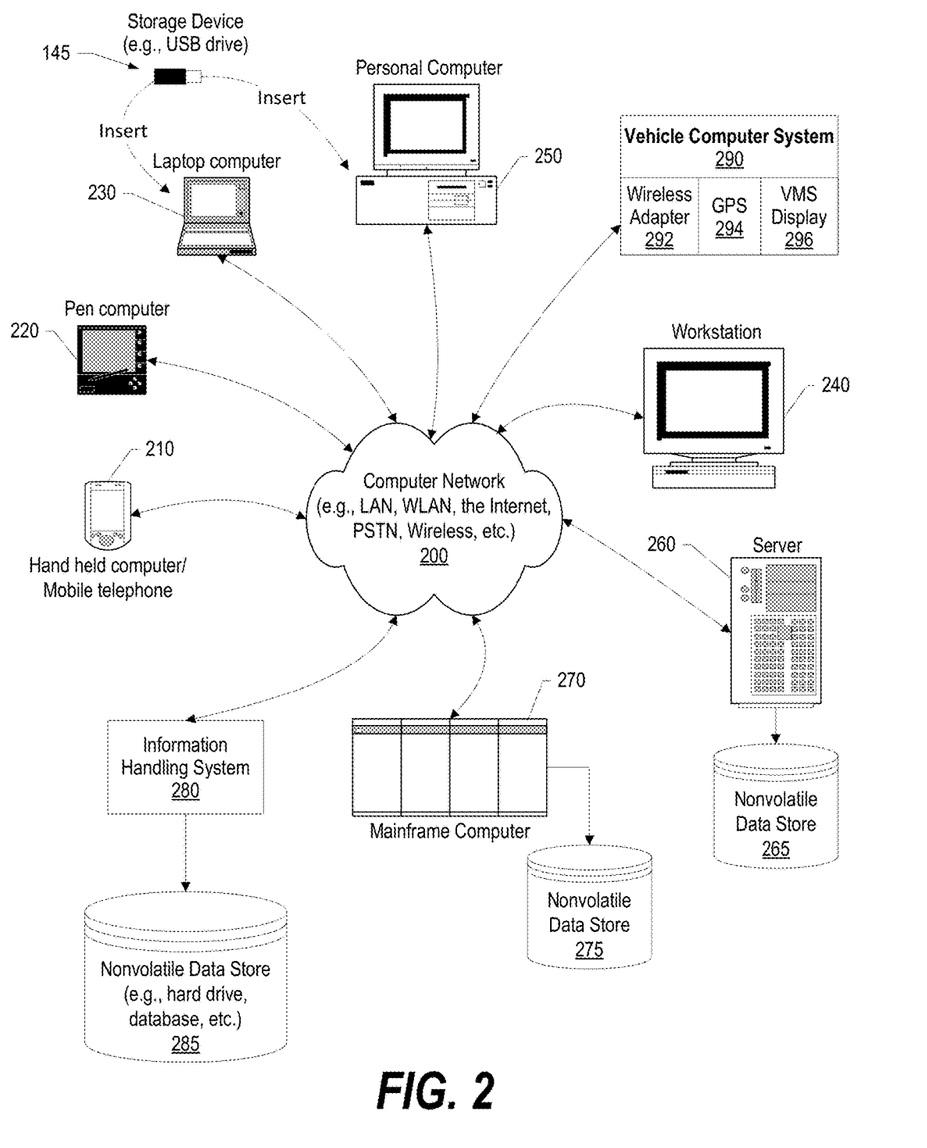
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
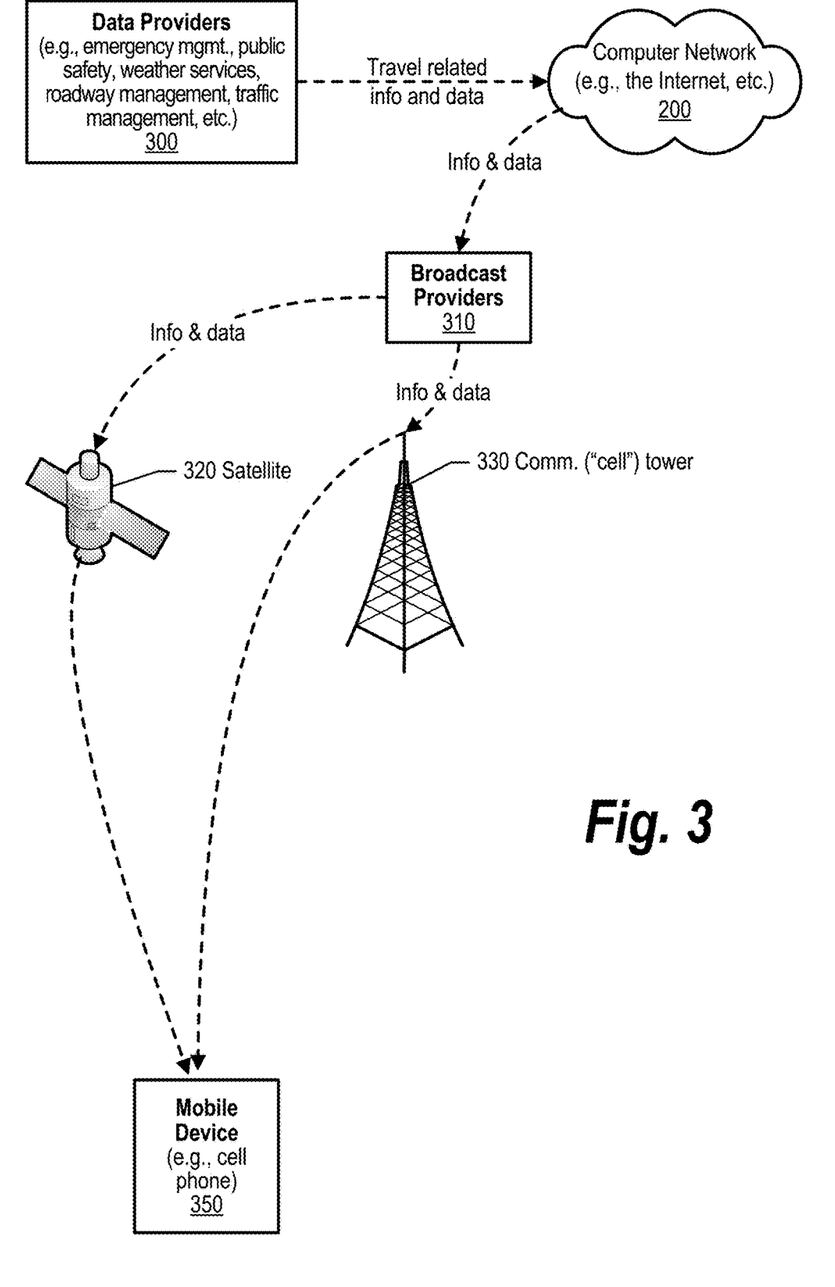
FIG. 3 is a component diagram depicting an exemplary environment providing power reserve based on a predicted natural calamity.

FIG. 3 is a component diagram depicting an exemplary environment providing power reserve based on a predicted natural calamity. Data providers 300, such as emergency management, public safety organizations, weather services, roadway management, traffic management, and the like, provide data pertaining to current and predicted natural calamities such as hurricanes, severe thunderstorms, tornados, floods, severe snow storms, and the like. The data prepared by data providers 300 is transmitted through computer network 200, such as the Internet, from which it is eventually received by broadcast providers 310. Broadcast providers 310 include mobile telephone networks, wireless networks, public or government provided wireless information networks, and the like. Broadcast providers 310 utilize a variety of equipment to wirelessly broadcast data pertaining to current and predicted natural calamities to various mobile devices. This equipment includes satellites 320 and communications towers 330, such as a "cell" tower.

Mobile device 350 receives wireless data pertaining to current and predicted natural calamities from broadcast providers 310. As shown in FIGS. 4-7, processes running on the mobile device operate to conserve battery power at the mobile device as well as to instruct the user of the mobile device to fully charge the device in anticipation of the natural calamity during which traditional electrical power might not be available from the electric power grid that provides electricity to the user's dwelling or business.

Figure 4:
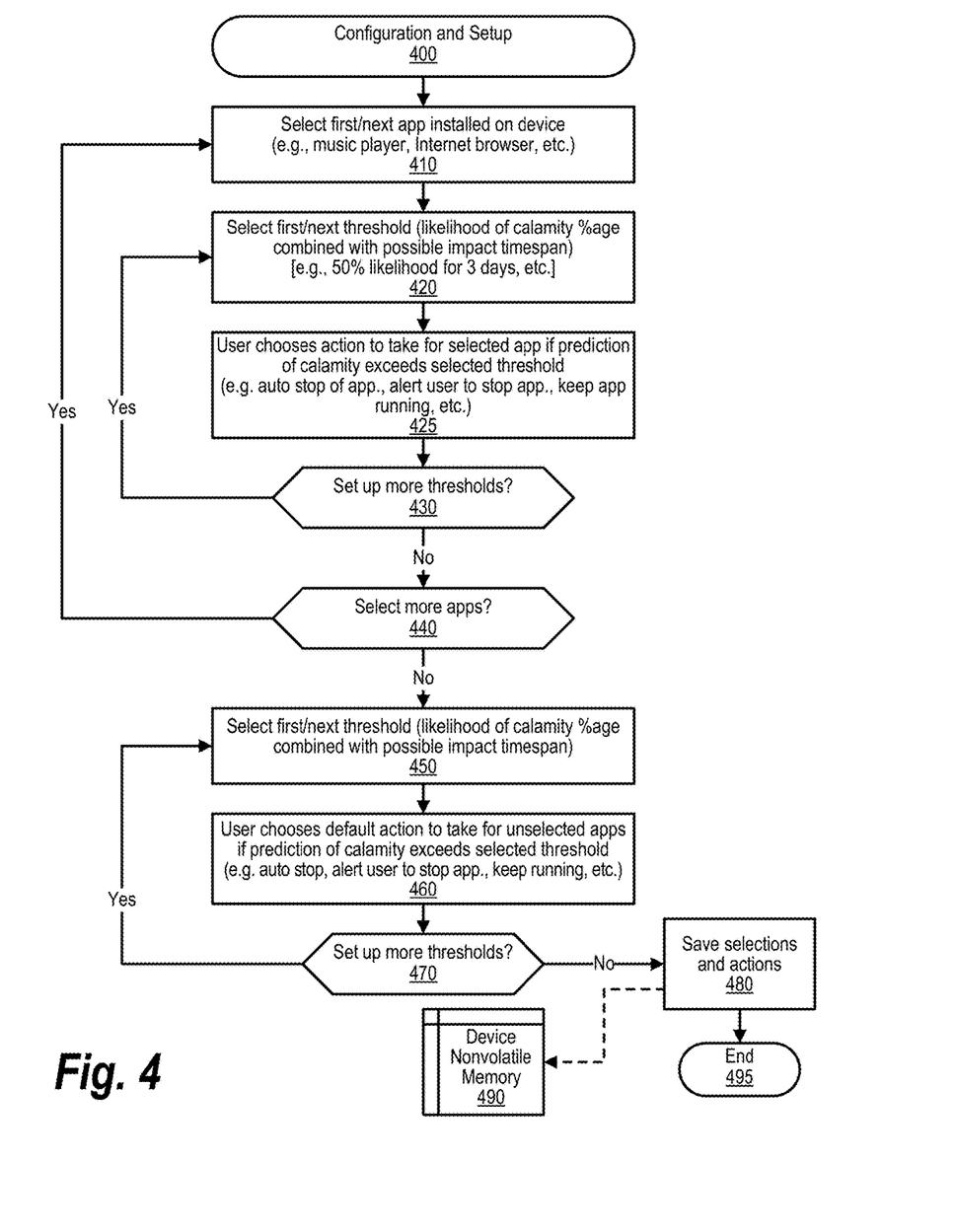
FIG. 4 is a flowchart showing configuration and setup of the system that provides power reserve based on a predicted natural calamity.

FIG. 4 is a flowchart showing configuration and setup of the system that provides power reserve based on a predicted natural calamity. FIG. 4 processing commences at 400 and shows the steps taken by a process that performs configuration and setup of the process that reserves power based on a predicted natural calamity. At step 410, the process selects the first software application, or "app," installed on device (e.g., music player, Internet browser, etc.).

At step 420, the process selects the first threshold. For example, an impact can be computed as the likelihood of the natural calamity occurring in the user's geographic area combined with the possible impact time span, such as number of hours or days the impact is likely to last. Using this impact example, the user might select a threshold of a fifty percent (50%) likelihood that the natural calamity lasts for 3 days, etc. At step 425, the user chooses an action to take for the selected app when a natural calamity prediction values exceed the thresholds selected by the user. For example, the user may choose to automatically terminate the app, alert the user to terminate the app, or keep the app running. Non-essential apps, such as a music player, may be identified as apps to automatically close, while apps that are potentially helpful during a natural calamity, such as an emergency broadcast or weather app, may be identified as apps to continue running during the natural calamity.

The process determines as to whether the user wishes to set up additional thresholds (decision 430). If the user wishes to set up additional thresholds, then decision 430 branches to the 'yes' branch which loops back to step 420 to select the next threshold. This looping continues until the user does not wish to set up additional thresholds, at which point decision 430 branches to the 'no' branch exiting the loop. The process determines as to whether there are more apps installed on the device to select and process (decision 440). If there are more apps installed on the device to select and process, then decision 440 branches to the 'yes' branch which loops back to step 410 to select the next app on the device. This looping continues until are no more apps installed on the device to select and process, at which point decision 440 branches to the 'no' branch exiting the loop.

At step 450, the process selects the first default threshold. As the name implies, default thresholds and actions are taken on apps that were not specifically configured in steps 410 through 440. For example, an impact can be computed as the likelihood of the natural calamity occurring in the user's geographic area combined with the possible impact time span, such as number of hours or days the impact is likely to last. Using this impact example, the user might select a threshold of a fifty percent (50%) likelihood that the natural calamity lasts for 3 days, etc. At step 460, the user chooses default action to take for unselected apps if prediction of calamity exceeds selected threshold, such as automatically terminate the app, alert the user to terminate the app, or keep running the app on the mobile device.

The process determines as to whether the user wishes to set up additional default thresholds (decision 470). If more default thresholds are desired, then decision 470 branches to the 'yes' branch which loops back to step 450 to select and define the next default threshold. This looping continues until no more default thresholds are desired, at which point decision 470 branches to the 'no' branch exiting the loop. At step 480, the process saves selections and actions in device nonvolatile memory area 490. Configuration and setup processing performed by the steps shown in FIG. 4 thereafter ends at 495.

Figure 5:
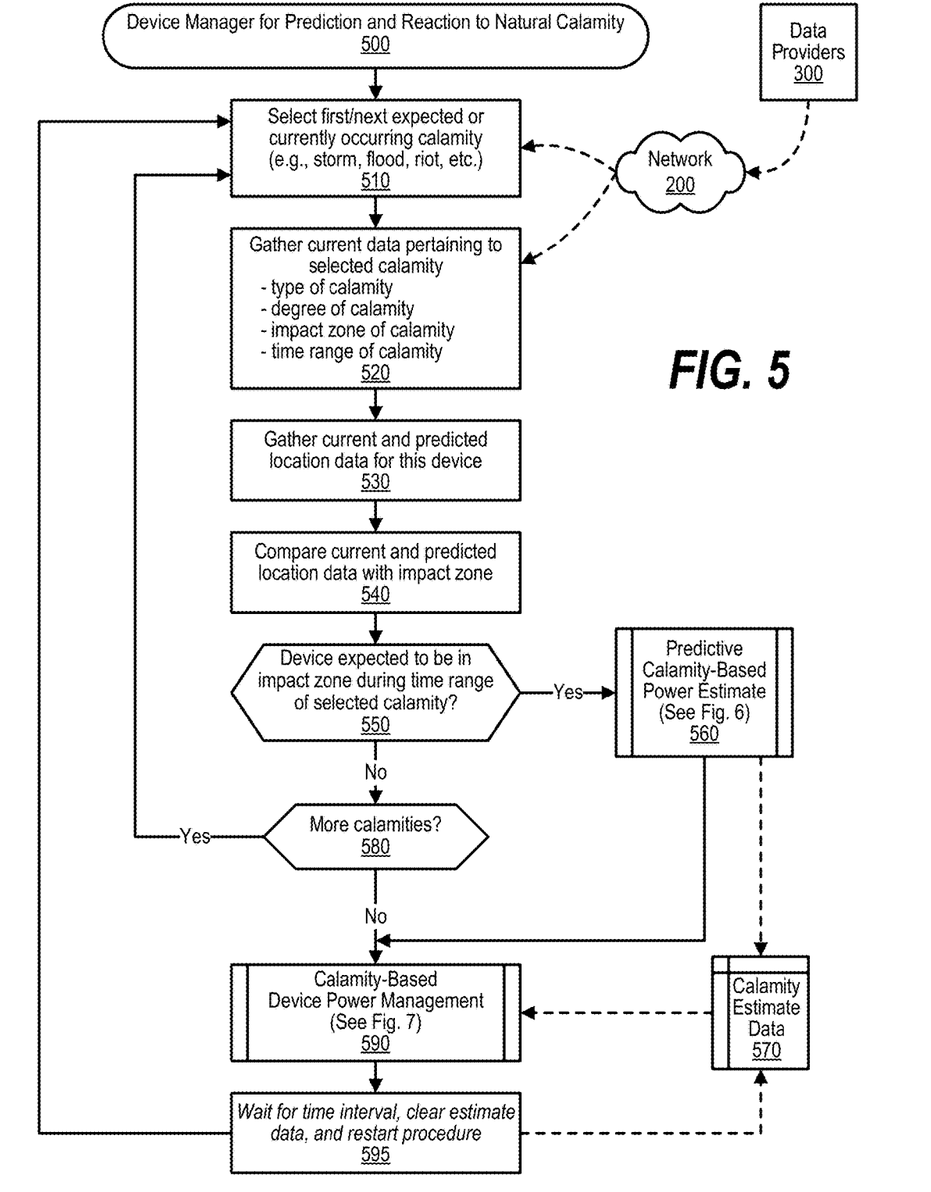
FIG. 5 is a flowchart showing steps taken by a device manager for prediction and reaction to natural calamity.

FIG. 5 is a flowchart showing steps taken by a device manager for prediction and reaction to natural calamity. FIG. 5 processing commences at 500 and shows the steps taken by a device manager running on the user's mobile device that performs a routine for predicting and reacting to a predicted natural calamity. At step 510, the process selects the first expected or currently occurring natural calamity (e.g., storm, flood, hurricane, riot, etc.). The natural calamity data is received via computer network 200, such as the Internet, and the natural calamity data is prepared by data providers 300 that transmit the data to the computer network.

At step 520, the process gathers the current, or most up-to-date, data pertaining to the selected natural calamity that is either occurring or is predicted to occur. This data includes the type of calamity (e.g., hurricane, flood, storm, tornado, etc.), the degree of calamity (e.g., major hurricane, minor flooding, etc.), the impact zone of the calamity (e.g., expected geographic areas that will be impacted by the natural calamity, etc.), and the time range of calamity (e.g., for the next seven days for a major hurricane, for two days for a severe storm, etc.).

At step 530, the process gathers current and predicted location data for this device. Current location, or geographic, data for the user's mobile device is obtained using a GPS module in the device or a similar type of module that obtains the geographic data through other means, such as triangulation using mobile telephone network towers, etc. Predicted location data is gathered by analyzing data stored on the device and maintained by the user, such as the user's upcoming travel itineraries, etc. For example, the user may have an entry indicating that the user plans to drive from Chicago to Denver in two days. In this example, a natural calamity expected to affect Denver in two or three days might impact the user.

At step 540, the process compares the device's current and predicted location data with the anticipated impact zone of the selected natural calamity. The process determines as to whether the user's mobile device, and therefore the user, is likely to be in the anticipated impact zone during the anticipated time range of the selected natural calamity (decision 550). If the user's mobile device, and therefore the user, is likely to be in the anticipated impact zone during the anticipated time range of the selected natural calamity, then decision 550 branches to the 'yes' branch whereupon predefined process 560 is performed. At predefined process 560, the process performs the Predictive Calamity-Based Power Estimate routine (see FIG. 6 and corresponding text for processing details). Data generated by predefined process 560 is stored in calamity estimate data memory area 570.

On the other hand, if the user's mobile device is not expected to be in the anticipated impact zone during the anticipated time range of the selected natural calamity, then decision 550 branches to the 'no' branch bypassing predefined process 560. The process determines as to whether there are more natural calamities to process (decision 580). If there are more natural calamities to process, then decision 580 branches to the 'yes' branch which loops back to step 510 to select and process the next natural calamity as described above. This looping continues until there are no more natural calamities to process, at which point decision 580 branches to the 'no' branch exiting the loop.

Figure 7:
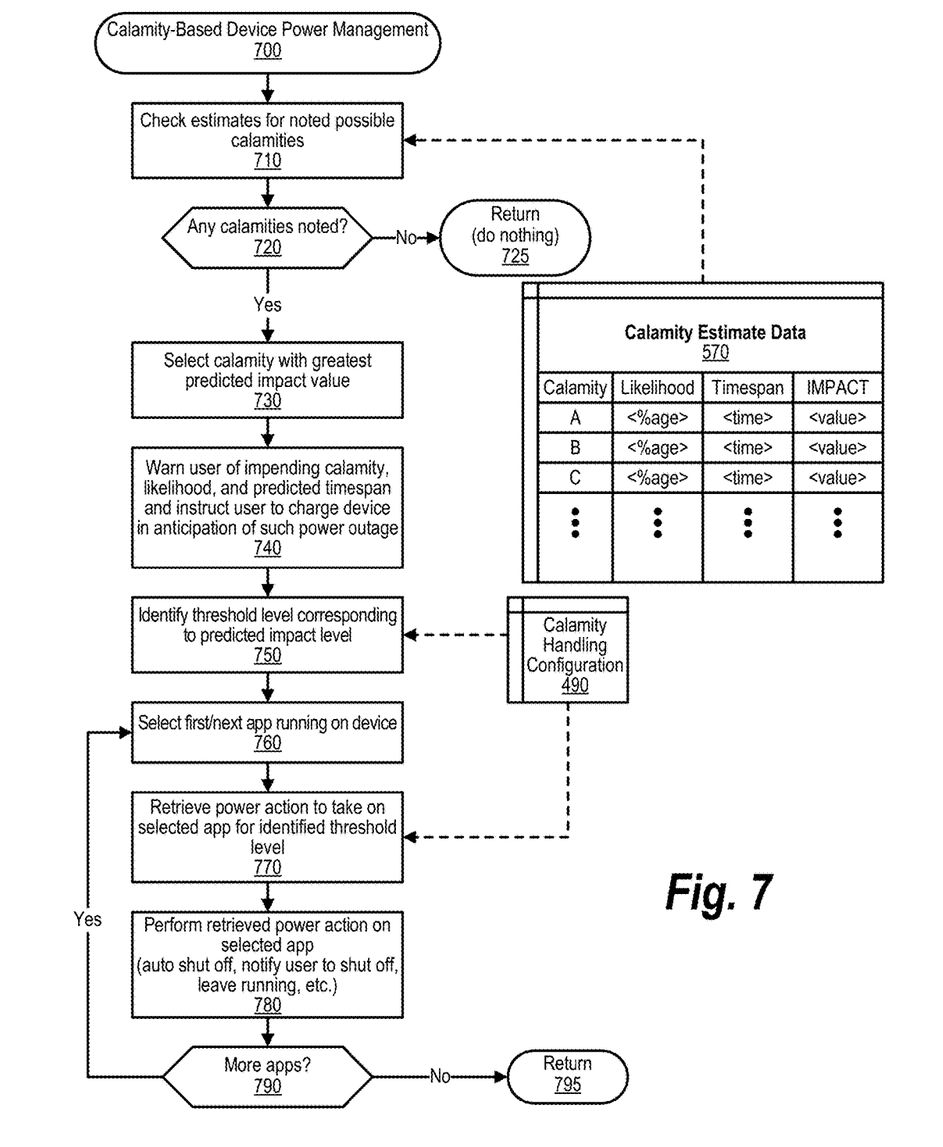
FIG. 7 is a flowchart showing steps that perform a calamity-based device power management routine.

At predefined process 590, the process performs the Calamity-Based Device Power Management routine (see FIG. 7 and corresponding text for processing details). Predefined process 590 utilizes calamity estimate data stored in memory area 570 to perform the calamity-based device power management routine. At step 595, the process waits for a time interval to elapse (e.g., ten minutes, etc.) before re-executing the routine shown in FIG. 5. When the time interval has elapsed, the process clears the estimate data from memory area 570, and restarts procedure by looping back to step 510.

Figure 6:
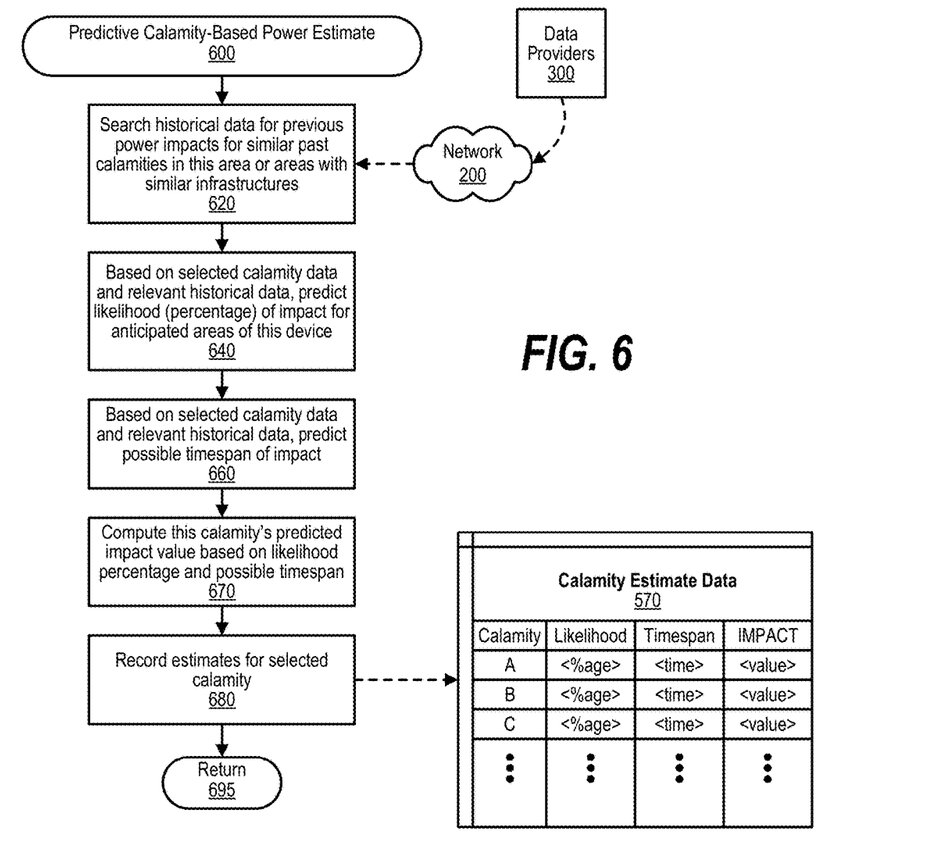
FIG. 6 is a flowchart showing steps that perform a predictive calamity-based power estimate.

FIG. 6 is a flowchart showing steps that perform a predictive calamity-based power estimate. FIG. 6 processing commences at 600 and shows the steps taken by a process that gathers predictive calamity-based power estimate data. At step 620, the process searches historical data for previous power impacts for similar past calamities in this area or areas with similar infrastructures. The historical data is provided by data providers 300 (e.g., archive data maintained by data providers, etc.) which is transmitted via computer network 200, such as the Internet, and received by the mobile device.

At step 640, the process predicts a likelihood (e.g., percentage, etc.) of impact for the anticipated areas of this mobile device based on the selected calamity data and relevant historical data gathered in step 620. At step 660, the process predicts a possible, or estimated, time span of impact of the natural calamity based on the selected calamity data and relevant historical data gathered in step 620.

At step 670, the process computes this natural calamity's predicted impact value based on the likelihood percentage and the possible time span. At step 680, the process records data pertaining to the natural calamity in memory area 570. As shown, the data maintained for a natural calamity includes the likelihood of the natural calamity affecting the user's geographic area, the expected time span of the natural calamity, and the anticipated impact value of the natural calamity that was computed in step 670. FIG. 6 processing thereafter returns to the calling routine (see FIG. 5) at 695.

FIG. 7 is a flowchart showing steps that perform a calamity-based device power management routine. FIG. 7 processing commences at 700 and shows the steps taken by a process that performs calamity-based device power management at the user's mobile device. At step 710, the process checks natural calamity estimate data for noted possible calamities that are anticipated to affect the user's current or anticipated locations. The natural calamity estimate data is retrieved from memory area 570 and was gathered using the routine shown in FIG. 6.

The process determines as to whether any calamities were found in the natural calamity estimate data that are expected to impact the user (decision 720). If any calamities were found in the natural calamity estimate data that are expected to impact the user, then decision 720 branches to the 'yes' branch to process the data. On the other hand, if no calamities were found in the natural calamity estimate data that are expected to impact the user, then decision 720 branches to the 'no' branch whereupon processing returns to the calling routine (see FIG. 5) at 725 without performing any device power management functions.

At step 730, the process selects the natural calamity with greatest predicted impact value. At step 740, the process warns user of the impending natural calamity, as well as the likelihood that the natural calamity will affect the user, and the predicted time span of the natural calamity. The process further instructs the user to charge the user's mobile device in anticipation of a power outage based on the anticipated natural calamity.

At step 750, the process identifies the threshold level corresponding to the predicted impact value by retrieving threshold data from configuration memory area 490. At step 760, the process selects the first app running on device. At step 770, the process retrieves a power action to take on selected app for the identified threshold level. At step 780, the process performs the retrieved power action on the selected app (e.g., automatically terminate the app, notify the user to terminate the app, keep the app running, etc.). The process determines as to whether there are more apps to process (decision 790). If there are more apps to process, then decision 790 branches to the 'yes' branch which loops back to step 760 to select and process the next app running on the device. This looping continues until there are no more apps to process, at which point decision 790 branches to the 'no' branch exiting the loop. FIG. 7 processing thereafter returns to the calling routine (see FIG. 5) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for conserving power of a mobile device upon predicting a natural calamity, the method comprising:

receiving natural calamity data over a computer network at a mobile device, wherein the natural calamity data corresponds to a natural calamity, a predicted geographic impact zone of the natural calamity, a calamity type, and an estimated time range of the natural calamity occurring within the predicted geographic impact zone;

comparing the predicted geographic impact zone of the natural calamity with an anticipated geographic location of the mobile device;

in response to determining that the predicted geographic impact zone and the anticipated geographic location of the mobile device overlap, the method further comprises:

calculating, by the mobile device, an estimated recovery time to recover power from the natural calamity based on the calamity type and the time range of the natural calamity;

determining, by the mobile device, a next recharge time of the mobile device based on the estimated recovery time to recover power;

calculating, by the mobile device, a total power requirement until the next recharge time based upon power consumed by a set of services currently executing on the mobile device;

notifying a user of the mobile device to charge the mobile device for a period of time based on the calculated total power requirement and the next recharge time; and restricting one or more of the set of services on the mobile devices to reduce battery consumption by the mobile device, wherein the restricting is based on the calculated total power requirement and the next recharge time.

2. The method of claim 1 wherein the restricting further comprises:

closing one or more software applications corresponding to the set of services.

3. The method of claim 2 further comprising:

selecting the one or more software applications based on a user-supplied preference and the calculated total power requirement and the next recharge time.

4. The method of claim 2 further comprising:

selecting the one or more software applications based upon a user-supplied application preference and a user-supplied threshold, wherein the user-supplied threshold is compared with a predicted likelihood value of the natural calamity.

5. An information handling system comprising:

one or more processors;

one or more data stores accessible by at least one of the processors;

a display accessible by at least one of the processors;

a memory coupled to at least one of the processors; and a set of computer program instructions stored in the memory and executed by at least one of the processors in order to predict a natural calamity by performing actions comprising:

receiving natural calamity data over a computer network at a mobile device, wherein the natural calamity data corresponds to a natural calamity, a predicted geographic impact zone of the natural calamity, a calamity type, and an estimated time range of the natural calamity occurring within the predicted geographic impact zone;

comparing the predicted geographic impact zone of the natural calamity with an anticipated geographic location of the mobile device;

in response to determining that the predicted geographic impact zone and the anticipated geographic location of the mobile device overlap, the method further comprises:

calculating, by the mobile device, an estimated recovery time to recover power from the natural calamity based on the calamity type and the time range of the natural calamity;

determining, by the mobile device, a next recharge time of the mobile device based on the estimated recovery time to recover power;

calculating, by the mobile device, a total power requirement until the next recharge time based upon power consumed by a set of services currently executing on the mobile device;

notifying a user of the mobile device to charge the mobile device for a period of time based on the calculated total power requirement and the next recharge time; and restricting one or more of the set of services on the mobile devices to reduce battery consumption by the mobile device, wherein the restricting is based on the calculated total power requirement and the next recharge time.

6. The information handling system of claim 5 wherein the actions further comprise:

closing one or more software applications corresponding to the set of services.

7. The information handling system of claim 6 wherein the actions further comprise:

selecting the one or more software applications based on a user-supplied preference and the calculated total power requirement and the next recharge time.

8. The information handling system of claim 6 wherein the actions further comprise:

selecting the one or more software applications based upon a user-supplied application preference and a user-supplied threshold, wherein the user-supplied threshold is compared with a predicted likelihood value of the natural calamity.

9. The information handling system of claim 5 whereupon the predicting of the natural calamity further comprises:

wherein the current data also comprises a predicted geographic impact zone of the natural calamity and a predicted impact value of the natural calamity;

comparing the predicted geographic impact zone of the natural calamity with an anticipated geographic location of the mobile device; and performing the calculating of the total power requirement in response to the comparison.

10. A computer program product stored in a computer readable storage medium, comprising computer program code that, when executed by an information handling system, predict a natural calamity by causing the information handling system to perform actions comprising:

receiving natural calamity data over a computer network at a mobile device, wherein the natural calamity data corresponds to a natural calamity, a predicted geographic impact zone of the natural calamity, a calamity type, and an estimated time range of the natural calamity occurring within the predicted geographic impact zone;

comparing the predicted geographic impact zone of the natural calamity with an anticipated geographic location of the mobile device;

in response to determining that the predicted geographic impact zone and the anticipated geographic location of the mobile device overlap, the method further comprises:

calculating, by the mobile device, an estimated recovery time to recover power from the natural calamity based on the calamity type and the time range of the natural calamity;

determining, by the mobile device, a next recharge time of the mobile device based on the estimated recovery time to recover power;

calculating, by the mobile device, a total power requirement until the next recharge time based upon power consumed by a set of services currently executing on the mobile device;

notifying a user of the mobile device to charge the mobile device for a period of time based on the calculated total power requirement and the next recharge time; and restricting one or more of the set of services on the mobile devices to reduce battery consumption by the mobile device, wherein the restricting is based on the calculated total power requirement and the next recharge time.

11. The computer program product of claim 10 wherein the actions further comprise:

closing one or more software applications corresponding to the set of services.

12. The computer program product of claim 11 wherein the actions further comprise:

selecting the one or more software applications based on a user-supplied preference and the calculated total power requirement and the next recharge time.

13. The computer program product of claim 10 whereupon the predicting of the natural calamity further comprises:

wherein the current data also comprises a predicted geographic impact zone of the natural calamity and a predicted impact value of the natural calamity;

comparing the predicted geographic impact zone of the natural calamity with an anticipated geographic location of the mobile device; and performing the calculating of the total power requirement in response to the comparison.

* * * * *